Figure 1:
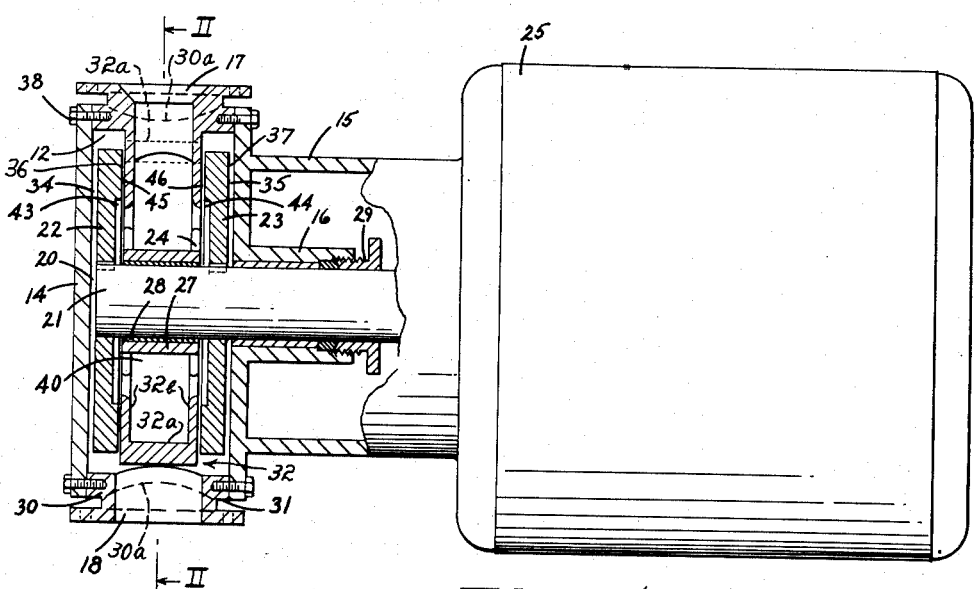

Sept. 15, 1953　　　J. H. MALLINSON ET AL　　　2,652,201
ROTARY DISK TYPE HOMOGENIZING MILL
Filed Feb. 27, 1948

INVENTORS.
JOHN HESELTON MALLINSON
CHARLES JAMES GEYER, JR.
BY Thomas R. O'Malley

Patented Sept. 15, 1953

2,652,201

UNITED STATES PATENT OFFICE 2,652,201

ROTARY DISK TYPE HOMOGENIZING MILL

John Heselton Mallinson, Front Royal, and Charles James Geyer, Jr., Cedarville, Va., assignors to American Viscose Corporation, Wilmington, Del., a corporation of Delaware Application February 27, 1948, Serial No. 11,648

1 Claim. (Cl. 241—146)

This invention relates to a process and a disintegrating machine for obtaining reduction of size of particles suspended in a fluid.

In many industrial processes in which liquids containing suspended solids or immiscible liquids are handled, fineness of the suspended material may materially affect the quality of final products, or the speed and cost of a manufacturing operation. For example, in extruding fine denier artificial filaments, the liquid to be extruded must be free of particles which might cause or contribute to the plugging of spinnerette orifices. Moreover, the presence of undissolved particles in a spinning liquid which readily pass through a spinnerette is objectionable since at any point along a filament at which such particles occur, the strength of the filament is reduced. When such particles occur, the strength of the filament is reduced. When the liquid is a solvent for solid material suspended therein, complete elimination of the suspended material, except for impurities, is possible. The impurities when present to a minor extent in particle form, may be rendered unobjectionable by sufficient reduction in fineness. For example, in the manufacture of viscose rayon, the spinning liquid is prepared by dissolving cellulose xanthate in aqueous caustic soda solution. In spite of the thorough mixing received by these materials in conventional practice, the xanthate solution contains small particles of undissolved material ranging in size from those easily visible to those of colloidal proportions. Hence, the usual manufacturing practice of viscose yarn requires the passage of cellulose xanthate solution through three or four stages of filter presses to remove such particulate material before spinning the liquid. The extent and complexity of filtering equipment and the attention required in the operation thereof may be substantially reduced if the completeness of solution is such that the liquid contains practically no undissolved soluble material. Complete solution of fine undissolved particles is possible with continued mixing or mechanical agitation but is highly impractical in the conventional equipment heretofore used because of the time and energy required. Repeated filtration of the viscose solution is therefore resorted to in order that mixing periods may be held within practical limits.

It is an object of this invention to provide a disintegrating, mixing and homogenizing machine for treating liquid suspensions. Another object is to provide an apparatus capable of reducing the size of colloidal particles. A further object is to provide an improved method and apparatus capable of reducing the size of colloidal particles. A further object is to provide an improved method and apparatus for preparing cellulose xanthate solutions which substantially reduces the need for filtration equipment and operating labor therefor. Still another object is to effect savings of materials in processes such as in viscose rayon manufacturing wherein, by employing the invention, less caustic is needed to dissolve cellulose xanthate and less acid is thereafter needed to neutralize excess caustic. Other objects, features, and advantages of the invention will be apparent from the drawing and the following description thereof.

Figure 2:
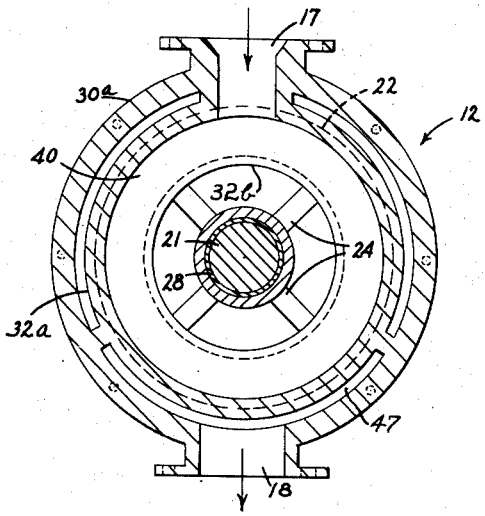

In the drawing illustrative of the invention,

Figure 1 is an elevation, partly in section, of a disintegrating mill according to the invention; and Figure 2 is a section of the mill perpendicular to its shaft axis.

According to the invention, a mill is provided in which the grinding, disintegrating, homogenizing and/or mixing action upon fluid suspended materials are performed, in two axially-spaced, radially-extending, annular clearances between work surfaces on opposite sides of a casing and surfaces closely spaced thereto on two rotating disc-members fixed to a shaft extending through the casing.

In Figure 1, a mill is shown comprising a casing 12 having an inlet duct 17 and an outlet duct 18, a flat disc closure 14, a housing 15 having the flat portion shown which acts as a closure for one side of the casing 12 and supporting a shaft bearing 16, a rotor 20 comprising a shaft 21 and disc members 22 and 23. A driving means such as the motor 25 drives the rotor 20.

The casing 12 (best shown in Figure 2) will be more easily constructed as a single member or casting of any desired material such as iron, brass, or aluminum, although it may be readily fabricated from plate or sheet metal. The corrosiveness and abrasiveness of the substance to be processed in the mill will ordinarily determine the material selected for construction of the casing 12. As shown in Figure 1, the casing 12 supports a central bearing 27 for shaft 21 on spokes 24. Such a bearing tends to reduce rotor vibration and may be employed if the substance to be processed acts as a lubricant between the shaft and a sleeve 28 for the bearing. However, if desired, the bearing 27 and the spokes 24 may be eliminated if suitable bearing support is provided for the shaft in the exterior bearing 16. To prevent leaking along the rotor shaft, a packing gland may be provided such as the gland 29 shown in threaded relationship with the bearing 16. A plurality of holes are drilled and threaded in the outer flanged portions 30 and 31 so that closure 14 and the housing 15 may be attached to opposite sides of the casing by means such as cap screws 38. As shown, the casing 12 comprises an outer ring or shell 30a and an inner ring or shell 32 supported in spaced concentric relationship with the ring 30a. The inner ring has a generally cylindrical wall 32a and annular end walls 32b which extend radially inwardly from the wall 32a. The casing 12 is open, as shown, along the inner circumferences of the end walls to allow material which enters the mill through the duct 17 to pass interiorly from the ring 32 in the clearance regions between the discs 22 and 23 and the end walls of the inner ring. The end walls 32b have outer surfaces 36 and 37 hereafter referred to. The outer ring 30a extends as flanges 30, in an axial direction beyond both ends of the inner ring. The casing 12 may also be constructed as a two-member structure (not shown) comprising an outer housing and a separate inner casing corresponding respectively to the outer shell of casing 12 indicated by the flanged portion 30 in Figure 2 and the inner shell 32.

The rotor 20 is preferably mounted in the mill so that equal clearances are maintained between the surfaces of discs 22 and 23 and respective adjacent casing surfaces 36 and 37 during operation. Clearances of less than 0.010 inch are preferred in order to obtain the shearing forces which cause efficient particle disintegration. Clearance settings in the range of 0.001 to 0.004 inch were found satisfactory for milling a slurry of xanthated cellulose and sodium hydroxide. The spaced milling surfaces which form the clearance regions 45 and 46 may be smooth or, they may be roughened as by a short blast treatment. If desired, one surface may be smooth while the cooperating surface at the opposite side of the clearance space is rough.

In operation a liquid suspension is supplied under pressure to the mill through the inlet 17 and enters the annular region 40 from whence it flows between spokes 24 into annular cavities 43 and 44 formed by the casing sides and annular recesses of disc-members 22 and 23 radially inward of their respective working surfaces. The liquid material then enters clearance regions 45 and 46 as the disc-members 22 and 23 rotate rapidly with respect to the casing 12. The material is therein subjected to great shearing stresses, and particles of solid or immiscible liquid material are reduced to dimensions substantially smaller than the clearances being maintained. The material then passes from the clearance regions and through cavities 34 and 35 contiguous with the outlet 18 to be discharged from the mill.

Although some centrifugal force is imparted by the rotor 20 to the material passing through the clearance regions 45 and 46 to produce a moderate pumping effect, the rate of material flow through the mill is controlled primarily by the inlet pressure, or it may be controlled to a minor extent by vacuum applied to the outlet. The degree of milling performed by the machine is dependent also upon the clearance setting and the speed of rotation. Therefore the performance of the mill at a certain clearance setting may be controlled by varying either or both the inlet pressure and the rotor speed. In the milling of some liquids, particularly those of high viscosity, a cooling means, may be needed to maintain the mill at a temperature not injurious to any substances contained in the liquid materials. In that event, the outer surfaces of the mill may be provided with cooling jackets (not shown) through which a liquid coolant is circulated, or cooling fins (not shown) adapted to receive an air current.

The mill herein described has particular utility in producing a colloidal solution from a slurry of sodium cellulose xanthate in an aqueous medium, and especially aqueous sodium hydroxide, as the xanthate comes from the churn at the completion of xanthation. As a departure from the usual practice wherein the slurry from the xanthation operation is subjected to the action of a mixer, or an attritor, or a combination of both, the slurry from the churn is passed through a mill of the type herein described. Instead of the usual mixture containing lumps and gels of undissolved xanthated cellulose up to one-eighth of an inch in thickness, a suspension is obtained which contains suspended colloidal particles of microscopic proportions which dissolve within ten minutes to an hour after leaving the mill. During this period the suspension may be gently agitated as by stirring or recirculation, if desired. The resultant solution after a holding period of a half an hour may be filtered, if desired, to remove any incompletely dispersed solid impurities. The filtration equipment used, is relatively simple and inexpensive compared to that ordinarily employed in viscose preparation.

A satisfactory mill for processing a slurry of xanthated cellulose has been built having rotor discs which are 14⅝ inches in diameter. This is also the extreme outer diameter of the annular mill surface of the discs; the inside diameter is 8⅝ inches. The rotor grinding surfaces are spaced at 0.002 of an inch from adjacent surfaces of the casing. An inlet pressure of approximately 200 pounds per square inch will cause about 40 gallons per minute of slurry to flow through the mill although the inlet pressure may be varied very satisfactorily within the range of 190 to 220 pounds per square inch at a rotor speed of 875 revolutions per minute. Greater or lesser rotor speeds are permissible but in order to adapt the mill for direct drive with a 30 horsepower electric motor of standard size and speed, the mill was operated at 875 revolutions per minute.

The product of the mill has greatly increased filterability which increases appreciably after a holding period of half an hour. One pass through the mill produces a viscose solution which cannot be equaled in filterability by repeated passes through conventional mixer-attritor equipment. Although one pass through the mill may be sufficient, two or more passes may be made; or, if desired, successive passes may be made through mills having successively reduced clearances. It was found that viscose solutions obtained after one pass through the mill, when tested on filters of standard area and composition, had greatly improved filterability over any similarly aged solutions prepared according to conventional practices, and a much lower gel count, when examined for the number of gels of undissolved xanthated cellulose per unit volume.

It is found that by subjecting viscose solution to the intense shearing and disintegrating action of a mill such as herein described that less carbon disulfide may be used in xanthating an alkali cellulose and complete solution of the xanthated cellulose may be obtained while using less sodium hydroxide. This is an important advantage, since in addition to savings in caustic, less acid is required for neutralization in the coagulation bath. With the acid consumption reduced, further economies are derived from reduction in the amount of steam, power and labor expended in the acid reclaim operation. It is roughly estimated, that the mill requires but sixteen percent of the power required for equipment such as an attritor, a cutter and a mixer, normally used to convert a slurry comprising xanthated cellulose and sodium hydroxide into an extrudable solution, while yielding a viscose solution of superior filterability. Since there is substantial flow of material through the mill, advantage may be taken of the fluid velocities at the inlet and outlet orifices to produce agitation in a mixing vessel. For example, the mill might be installed on the bottom or side of a viscose mixer or dissolving vessel.

The mill herein described is operated according to conditions and principles which are unorthodox in conventional homogenizing practice. Viscose solution, for example, is easily handled or transferred at fluid velocities in the range of one-tenth to five-tenths of a foot per second. Above this range of speeds, the energy required increases tremendously with increases in rate of transfer and is expended, principally, in raising the temperature of the liquid rather than increasing its kinetic energy. This consideration coupled with the belief by commercial colloid mill manufacturers that material to be milled must be fed slowly into the mill and retained in contact with the mill working surfaces for an appreciable period of time is responsible for the design of conventional mills. These mills have a low input rate and a high heat evolution resulting in temperature rises in the region of 15-18 degrees centigrade for viscose, and must be equipped with cooling systems. Moreover, the degree of homogenization performed is not as great or as uniform as that of the invention. However, it is found that in some viscose liquids, viscosity is reduced by increased rate of shear and such liquids may be advantageously handled in certain types of equipment wherein the liquid is forced between surfaces having a clearance on the order of a few thousandths of an inch. Viscose solutions and slurries of cellulose xanthate in aqueous sodium hydroxide solution respond in this manner to large shear forces so that when viscose is subjected to a shearing velocity of 3000 or more feet per minute extremely efficient homogenization is obtained. Shearing velocity is a composition of rates at any selected circumference of the opposing working surfaces according to the formula.

$$C=\sqrt{A^2+B^2}$$

wherein, $A$=viscose velocity in feet per minute due to supply pressure.
$B$=rotational velocity of the shearing surface of the spinning rotor in feet per minute.
$C$=shearing velocity of viscose in feet per minute.

By placing a liquid suspension in a high state of shear, homogenization may be accomplished with a fraction of one per cent of the power consumed when performed in the slow moving state inherent in conventional homogenization apparatus. The higher efficiency of this type of homogenization is well established by the observation, that, when the mill herein described was subjected to through-put rates in the range of 40 to 50 gallons per minute, the discharged liquid was only 1 to 1.5° C. warmer than that which entered the mill. The mill may be therefore easily operated without a cooling system. In conventional mills of much lower through-put capacity, a temperature rise in the range of 10 to 25° C. is normal and cooling for the exterior of the mill is usually provided.

In the method and apparatus described by the invention, intensity of shear is the controlling factor affecting the degree of homogenization; other factors, such as milling surface area, and duration of shear are relatively unimportant. Present information indicates that filterability of a viscose solution may be progressively increased with increased intensity of shear. While treating a cellulose xanthate slurry according to the invention shearing velocities n the range of 3000 to 18,000 feet per mnute were found sufficient to produce efficient homogenization. However, velocities up to 60,000 to 70,000 feet per minute may be employed to obtain finer dispersions and more rapid through-put rates. It has been found, therefore, that liquid suspensions which lose their viscosity when subjected to large shear forces, are most economically homogenized when subjected to these forces. The elements contributing to the intense shearing action developed by the invention include high feed pressure to the mill, very close spacing of the milling surfaces, ample inlet and outlet space within the mill adjacent the region in which milling or homogenizing is performed, and the relative rotational speed of the milling surfaces.

While the invention has been described particularly with regard to the making of a rayon spinning solution, it has broad applicability and its features and advantages will be recognized wherever it is desired to treat liquid suspensions to obtain extremely fine division of suspended materials. While a preferred embodiment has been shown, it is to be understood that changes and variations may be made without departing from the spirit and scope of the invention as defined by the appended claim.

We claim:

A mill for producing fine particle material comprising a single unitary casing and a rotor mounted therewithin; the casing comprising an outer cylindrical ring, an inner ring disposed in concentrically spaced relationship with the outer ring, the inner ring having an axial extent less than the outer ring and having a cylindrical wall and annular end walls which extend radially inwardly from the cylindrical wall, a single exhaust opening extending intermediately and radially through the outer ring, a feed duct extending in a radial direction through the outer ring, the cylindrical wall of the inner ring, and the space therebetween; a bearing supported centrally of the casing and means connected with one of the rings for supporting the bearing; said rotor comprising a shaft supported in said bearing, a pair of coaxial spaced discs mounted on the shaft, each disc extending radially into opposed relationship and close clearance with the outer surface of one of said end walls, the mill being open along the inner circumferences of said end walls for passage of material from exteriorly of the inner ring into the region between each disc and the adjacent end wall surface; and a flat plate secured to each end of the outer ring, one of the plates having an opening for extension of the shaft therethrough and sealing means associated with said plate to prevent the escape of milled material through the opening thereof.

JOHN HESELTON MALLINSON.
CHARLES JAMES GEYER, Jr.

References Cited in the file of this patent

UNITED STATES PATENTS

| Number | Name | Date |
|---|---|---|
| Re. 19,280 | Lilienfeld | Aug. 21, 1934 |
| 226,196 | Raymond | Apr. 6, 1880 |
| 238,260 | Tarr | Mar. 1, 1888 |
| 478,253 | Cummings | July 5, 1892 |
| 1,496,641 | Hurrell | June 3, 1924 |
| 1,650,088 | Molin | Nov. 22, 1927 |
| 1,862,592 | Goth | June 14, 1932 |
| 2,076,594 | Richter | Apr. 13, 1937 |
| 2,338,196 | Nash | Jan. 4, 1944 |
| 2,412,680 | Fisher | Dec. 17, 1946 |